United States Patent [19]

Ruckenstein et al.

[11] Patent Number: 5,508,348
[45] Date of Patent: Apr. 16, 1996

[54] INVERTED EMULSION PATHWAYS TO CONDUCTIVE POLYMERS

[75] Inventors: Eli Ruckenstein; Liang Hong, both of Amherst, N.Y.

[73] Assignee: The Research Foundation of SUNY, Albany, N.Y.

[21] Appl. No.: 289,408

[22] Filed: Aug. 12, 1994

[51] Int. Cl.$^6$ .......................... C08F 257/02; C08F 2/32; H01B 1/20; H01B 1/12

[52] U.S. Cl. .................. 525/98; 525/262; 525/332.9; 525/96; 525/186; 525/188; 525/189; 525/203; 525/279; 252/500; 252/518; 252/519

[58] Field of Search .................................. 252/500, 518, 252/519, 520; 525/186, 188, 189, 203, 279, 332.9, 262, 98, 96

[56] References Cited

U.S. PATENT DOCUMENTS

| | | | |
|---|---|---|---|
| 4,552,927 | 11/1985 | Warren | 525/186 X |
| 4,604,427 | 8/1986 | Roberts et al. | 252/500 X |
| 4,764,573 | 8/1988 | Myers | 252/519 X |
| 4,959,180 | 9/1990 | Armes et al. | 252/519 |
| 5,028,354 | 7/1991 | Smith et al. | 252/500 |
| 5,061,401 | 10/1991 | Wernet et al. | 252/500 |
| 5,158,707 | 10/1992 | Vestberg et al. | 252/500 |
| 5,188,766 | 2/1993 | Eiffler | 252/500 |
| 5,258,461 | 11/1993 | Facci et al. | 525/186 X |
| 5,331,056 | 7/1994 | Pecate et al. | 252/500 X |
| 5,417,890 | 5/1995 | Epron et al. | 252/500 |

FOREIGN PATENT DOCUMENTS 61-026648  2/1986  Japan .

OTHER PUBLICATIONS

Radhakrishnan, S., et al., "Novel electrical properties of conducting polypyrrole thermoplastic elastomer blends", *Polym. Sci.,* (1994), Allied Publ., New Delhi, India, vol. 2, 667–72.

Yang, Shiyong, et al., "Preparation and mechanical properties of electrically conductive polypyrrole–poly(ethylene-–co–vinyl acetate) composites", *Synthetic Metals,* 60 (3) (1 Oct. 1993), 249–254.

Ruckenstein et al, Polymer 32, 1230 (1991).

Ruckenstein et al, Synthetic Metals, 53, 283 (Mar. 1993).

Yang et al, Synthetic Metals, 59, 1 (Jun. 1993).

*Primary Examiner*—Douglas J. McGinty
*Attorney, Agent, or Firm*—George Blasiak

[57] ABSTRACT

A composite is formed wherein particles of a conductive polymer are uniformly distributed within a processable non-conductive polymer. In the method of the invention, an inverted emulsion is formed by dispersing an aqueous solution of oxidant in an organic solvent comprising a host polymer and an oil-soluble surfactant. A monomer whose polymerization yields a conductive polymer which is dissolved in a solvent miscible with the organic solvent of the emulsion is then added dropwise to the emulsion with agitation. The composite is separated from the emulsion and the precipitate is washed and dried.

8 Claims, 1 Drawing Sheet

INVERTED EMULSION PATHWAYS TO CONDUCTIVE POLYMERS

FIELD OF THE INVENTION

This invention relates to conductive polymers, and more particularly to composites comprising a conductive polymer distributed within a processable non-conductive polymer.

BACKGROUND OF THE INVENTION

Conductive polymers in their pure state have limited application because their lack of solubility and fusability renders them unprocessable by the conventional techniques of polymer processing: solution-casting and melt-processing. In the recent past, a number of alternative methods have been proposed for producing conductive polymers with improved processability.

U.S. Pat. No. 4,959,162 to Armes discloses processable electrically conductive compositions comprising colloidal particles of an oxidized, polymerizable aromatic heterocyclic monomer, a stabilizing effective amount of a vinylpyridine-containing polymer, and dopant ions.

Improving the processability of conductive polymers by compositing them with processable but non-conducting polymers has been the object of a number of inventions. U.S. Pat. No. 5,061,401 to Wernert achieved a processable composite containing a conducting polymer and a thermoplastic polymer substituted with sulfated alcohol groups. Monomer and substituted thermoplastic polymer were dissolved in polypropylene carbonate. Polymerization of the monomer was achieved electrochemically. U.S. Pat. No. 5,028,354 to Smith discloses a processable conducting polymer composite. The composite is formed by first casting a substrate from a solution containing a non-conducting but processable host polymer and a polymerization catalyst, treating said substrate so as to cause gelation of the host polymer, and exposing the gelled substrate to monomer vapor, thereby causing polymerization of the monomer on the surface and in the interior of the substrate.

Another technique common in the prior art for the formation of a conductive composite comprising a conductive polymer and a nonconductive processable host polymer involves the polymerization of conductive polymer on or in a preformed host polymer substrate. U.S. Pat. No. 4,699,804 to Miyata teaches that contacting a monomer solution with a host polymer substrate impregnated with polymerization catalyst, results in polymerization of the monomer on the surface and, to some degree, in the interior region near the surface of the substrate. U.S. Pat Nos. 4,696,835 to Maus and Des. 3,940,732 to Naarman teach that conductive polymers may be deposited on preformed polymeric substrates by first treating the surface of the substrate with a suitable polymerization catalyst and then exposing the treated surface to monomer vapor or to a solution containing monomer. U.S. Pat. No. 4,636,430 to Moehwald and U.S. Pat. No. 4,582,575 to Klivans each teach that the processable conductive polymers can be formed by impregnating a host polymeric substrate with a monomer and polymerizing the monomer electrochemically.

"Polypyrrole Conductive Composites Prepared by Coprecipitation" by Ruckenstein et al, *Polymer*, 32, 1991, pages 1230–1235, reported a uniformly distributed polypyrrole-polyurethane composite polymer formed by coprecipitation from a concentrated emulsion comprising polyurethane and an aqueous suspension of polypyrrole powder.

"An Emulsion Pathway to Electrically Conductive Polyaniline-Polystyrene Composites", by Ruckenstein et al., *Synthetic Metals*, March 1993, pages 283–293, discloses a uniformly distributed polyaniline-polystyrene composite formed by adding an aqueous solution of HCl containing an oxidant to an emulsion comprising a surfactant dissolved in water in the continuous phase, and in the dispersed phase, a mixture of aniline and polystyrene dissolved in an organic solvent.

SUMMARY OF THE INVENTION

A composite is formed wherein particles of a conductive polymer are uniformly distributed within a processable non-conductive polymer.

In the method of the invention, an inverted emulsion is formed by dispersing an aqueous solution of oxidant in a first organic solvent comprising a host polymer and an oil-soluble surfactant. A monomer whose polymerization yields a conductive polymer which is dissolved in second organic solvent that is miscible with the first organic solvent is then added dropwise to the emulsion with agitation. The composite is separated from the emulsion and the precipitate is washed and dried.

DETAILED DESCRIPTION OF THE INVENTION

Figure 1:
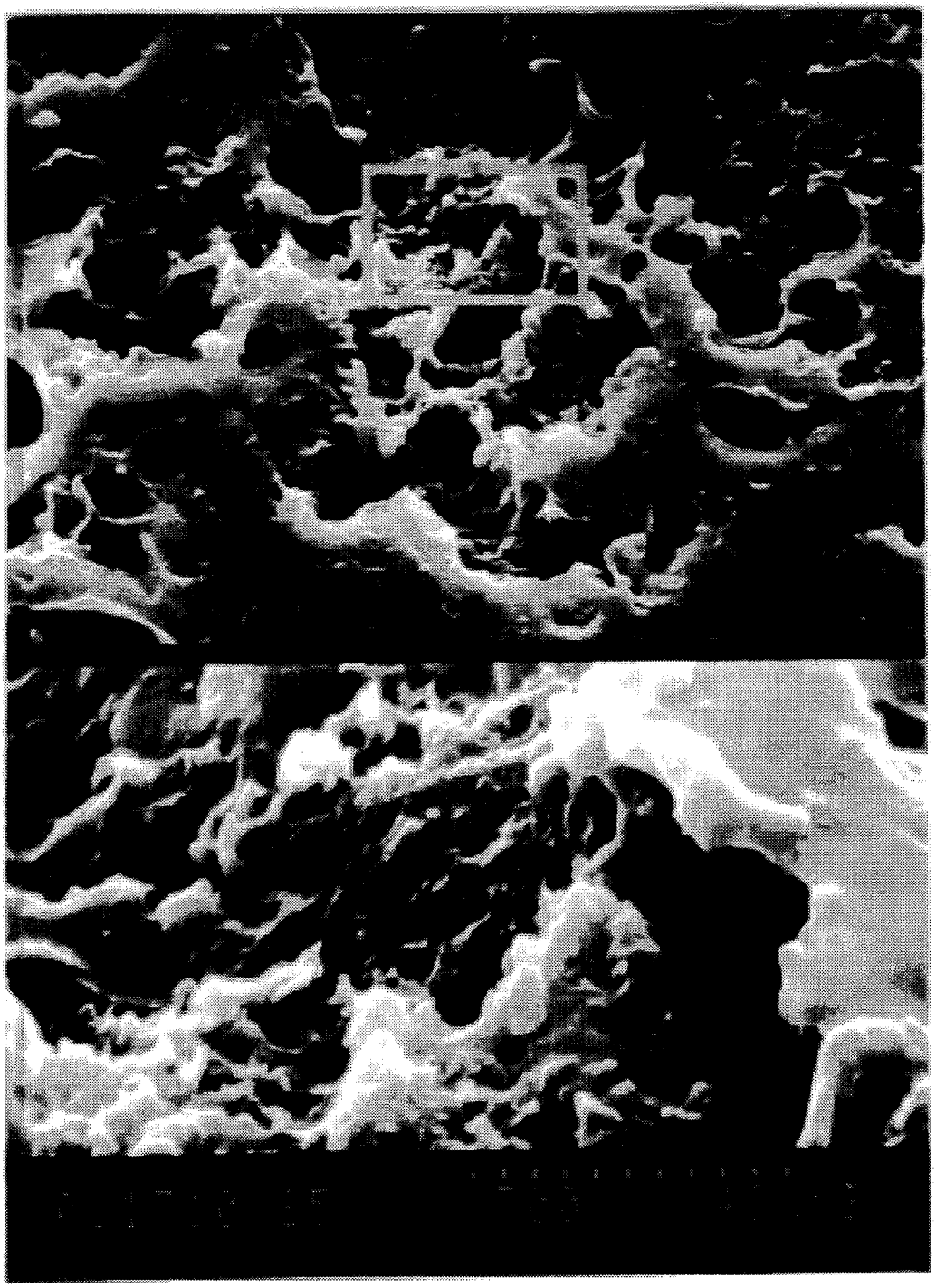
FIG. 1 is an SEM micrograph (700×magnification) showing the morphology of an illustrative embodiment of the invention.

The present invention relates to a composite comprising a conductive polymer uniformly distributed within a non-conductive polymer.

In the method of the invention, a first solution is formed comprising a non-conductive host polymer and an oil-soluble surfactant dissolved in an organic solvent (a first organic solvent). The first organic solvent may be a single organic solvent or may be a mixture of completely miscible organic solvents. Non-conductive polymers which may be used include styrene/butadiene/styrene triblock copolymer (SBS); styrene/ethylene-butylene/styrene (SES) triblock copolymer; ethylene/propylene (EP) copolymer; ethylene/vinylacetate (EVA) copolymer; acrylonitrile/butadiene (AB) copolymer; styrene/isoprene/styrene (SIS) triblockpolymer; ethylene/propylene/diene (such as butadiene, cyclopentadiene and isoprene) (EPDM) copolymer; polyurethane rubbers, such as toluene di-isocyanate/poly(butadiene)diol (TDI-BR); and acrylate rubbers, such as butyl acrylate/diene (BADM) copolymer.

Bis(2-ethylhexyl)sodium sulfosuccinate (AOT) is a preferred surfactant because it has two lipophilic chains and can effectively be used as an emulsifier to stabilize a W/O microemulsion. Other commercially available surfactants which can be employed as emulsifiers for W/O type emulsions include: (BRIJ) series, such as (BRIJ-92), which is mainly diethylene glycol oleyl ether; (SPAN) series, such as (SPAN-80), which is sorbitan monooleate; and (TWEEN) series, like (TWEEN-60), which is polyoxythylene sorbitanmonostearate (the above chemicals are manufactured by Fluka Chemika-BioChemica).

Meanwhile, suitable organic solvents include toluene, isooctane, liquid paraffin, benzene, xylenes, cyclohexane, chloroform, carbon tetrachloride, or their mixtures.

A second solution is formed comprising an oxidant dissolved in water. Suitable oxidants include: iron(III) chloride (FeCl3); potassium persulfat ($K_2S_2O_8$); ammonium persulfate (($NH_4)_2S_2O_8$)); iron(III) perchlorate ($Fe(ClO_4)_3$); potassium perchlorate ($KClO_4$); and potassium permanganate ($KMnO_4$).

Once the first and second solutions are formed, the second solution is introduced with stirring (or by other agitating means) into the first solution to form an inverted emulsion having in the continuous phase a non-conductive polymer and a surfactant dissolved in an organic solvent. In the dispersed phase, the inverted emulsion has an oxidant dissolved in water.

Next, a monomer whose polymerization yields a conductive polymer is dissolved in an organic solvent (a second organid solvent) to form a third solution. Suitable monomers include: pyrrole and its derivatives; thiophene and dithiophene and their derivatives; and aniline. The organic solvent used for dissolving the monomer, which may be selected from the group of organic solvents listed above for dissolving the non-conductive polymer, must be miscible with the organic solvent (the first organic solvent) or the mixture of organic solvents of the first organic solvent. With continued stirring or alternative agitation, the third solution is added slowly, preferably dropwise, into the emulsion.

Finally, the composite is separated from the emulsion by filtration or optionally, by inducing precipitation using a precipitation agent, followed by filtration. As will be recognized by those skilled in the art, the precipitation agent may be any solvent which is miscible with both the organic solvent and water and which does not dissolve the polymer composite. Agents which may be used include methanol ($CH_3OH$) and ethanol ($CH_3CH_2OH$).

The composite is then cleaned and processed by cold or hot processing.

Using the inverted emulsion method, the aqueous solution of an oxidant is dispersed in an organic polymer solution in the form of droplets, whose diameter, in general, falls in the range of from about 0.1 μm to a few μm. When an organic solution of pyrrole which is miscible with the polymer solution is introduced to the inverted emulsion, pyrrole molecules are oxidatively initiated and polymerized at the agueous/organic interface, and form numerous polypyrrole globules (pyrrole blacks) that have submicron diameters. The agglomeration of these pyrrole black particles is prevented by the viscous polymer solution; therefore, they are in a highly dispersed state in the polymer solution. As a significant amount of precipitant-agent (such as methanol) is introduced into the system, polymer chains contract rapidly and simultaneously trap the pyrrole black particles located nearby. Hence, the resulting composite has an interpenetrated structure, that is, pyrrole black particles are embedded in the polymer matrix and form several electrically conductive channels via the physical contact among them. As evidenced by conductivity measurements, the number of electrically conductive channels per unit area is much greater than that of conductive polymer composites formed in this lab using other methods.

EXAMPLE 1

In an illustrative embodiment of the invention, 3.0 g of SBS (Polymer Science, styrene content 28%) and 13.6 g, 30 mmole AOT (Aldrich, 98%) were dissolved in 75 ml toluene (Aldrich, 99+%). To the above solution, located in a 500 ml three-necked round bottom flask equipped with a mechanical stirrer, an aqueous solution of FeCl3 (Aldrich, 97%), 9.8 g, 60.5 mmole in 23 ml water, was introduced with stirring (about 700 rpm). An orange color inverted (water in oil) emulsion was thus generated. About 5 min. later, a solution of pyrrole (Aldrich, 99%), 2.0 g, 29 mmole, in 10 ml toluene was added with stirring to the emulsion over about 10 min. After the addition of the pyrrole-toluene solution, the color of the system became rapidly black, and stirring was continued for about 5 more min. Then, 200 ml of methanol was introduced to the stirred system to precipitate the composite. The entire process took place at room temperature. The black composite solid was filtered, washed several times successively with methanol and with water until the filtrate became colorless. Subsequently, the wet composite material was dried in a fume hood overnight. About 4.6 g of dry composite was obtained. Combustion method elemental analysis of the composite (wt %), performed by Quantitative Technologies, Inc., indicated: N %=5.10 and Cl %=3.74. The weight ratio of polypyrrole in the composite was 23.7%, while the theoretical ratio (quantitative conversion) of polypyrrole in the composite was 40%. Consequently, 66% of the pyrrole employed was included in the conductive network after polymerization.

Adjusting the Composite's Electrical and Mechanical Properties

Several process parameters affect either or both the electrical and mechanical properties of the composite. One such parameter, as illustrated by Example 2, is the weight ratio of conductive polymer to host polymer.

EXAMPLE 2

The process steps of Example 1 were followed to produce several samples. For each successive sample the weight ratio of pyrrole to SBS was increased, such that a set of samples were produced having pyrrole/SBS weight ratios between 0.5/3 and 5/3 (pyrrole content was incremented from a starting value of 0.5 g to 5 g while SBS content remained at 3 g). The remainder of the system's inputs were fixed as follows: 80 ml of toluene was used; the molar ratio of $FeCl_3$/pyrrole=2; the molar ratio of H2O/AOT=50; and [$FeCl_3$]=4.4M. The composites were processed and subject to testing of their electrical and mechanical properties. After being shaped into 2.5 cm discs at room temperature by cold processing, the composites were further pressed at 150° C. for 2–3 min and then cut into rectangles of 2.5×1.5 cm. Conductivities of cold-pressed and hot-pressed samples were measured by the four-point technique. Tensile testing was performed using an Instron Testing Instrument (Model 1000) at room temperature. Prior to such testing, samples were cut to the size required by the ASTM D.638-58T. Elongation speed was 20 mm/min. The conductivity, tensile strength, and break point elongation of seven samples having various PPY/SBS ratios are summarized in Table 1.

It is seen that the conductivity of the samples increases when the weight ratio of the conductive polymer to the host polymer is increased. However, the samples also exhibit a loss in elongation with increasing weight ratio of polypyrrole to SBS. With polypyrrole weight ratio higher than 2/3, as Samples 3–7 illustrate, the composites did not exhibit any elongation after hot pressing. The loss in elongation can be attributed to the rigidity of the polypyrrole domains in the SBS matrix. The conductivity v. conductive polymer—non-conductive polymer weight ratio percolation threshold (weight ratio percolation threshold) was reached at about 20–25 wt % polypyrrole loading of the composite. From the values of the electrical and mechanical properties, it is observed that the optimum ratio of pyrrole to SBS is in the range of from about 1/3 to 2/3.

Another process parameter which affects the electrical and mechanicl properties of the composites is the molar ratio of $H_2O$ to the surfactant, AOT. Example 3 illustrates the effect of decreasing the molar ratio of $H_2O$ to AOT.

EXAMPLE 3

Several samples were produced using the method of Example 1. For each successive sample the molar ratio of $H_2O$ to AOT was decreased, such that four samples were produced having molar ratios of $H_2O$ to AOT ranging from infinite to 16. The remainder of the system's inputs were fixed as follows: 80 ml toluene; molar ratio of $FeCl_3$/pyrrole=2; weight ratio pyrrole/SBS=2/3; $[FeCl_3]$=4.4M. Further, the composites were cold pressed into discs, then hot pressed and cut into sheets as described in Example 2. Conductivity was measured by the four-point technique. Table 2 illustrates the relationship between the molar ratio of $H_2O$ to AOT and the exhibited conductivity of the samples.

It is seen that conductivity increases as the molar ratio of $H_2O$ to AOT decreases. Without any surfactant (Sample 8) the composite exhibited a conductivity of less than 0.01 S/m. Yet, when a small amount of surfactant was added (Sample 9) conductivity exhibited a very large increase. The presence of AOT in the reversed emulsion system ensures a high surface area between the dispersed phase and the continuous phase (that is, between the pyrrole monomer and the oxidant). This results in tiny polypyrrole particles which can more readily achieve the conductivity v. water-surfactant molar ratio percolation threshold (water-surfactant ratio percolation threshold) at which a conductive network is formed.

Electrical and mechanical properties of formed composites are further influenced by the concentration of oxidant in the inverted emulsion system. Example 4 investigates the effect of changing the oxidant content for samples having various conductive polymer—host polymer weight ratios.

EXAMPLE 4

The method of Example 1 was used to produce several samples having various pyrrole-SBS weight ratios and oxidant concentrations. The remainder of the system's inputs were fixed as follows: 80 ml toluene; molar ratio of $FeCl_3$/pyrrole=2 (concentration of $FeCl_3$ was changed by varying the amount of water); AOT=13.6 g, 30 mmole. Samples were processed as described in Example 2, and their conductivities were measured. The results are summarized in Table 3.

For a composite having a PPY/SBS weight ratio of 2/3, the optimum conductivity of the composites was achieved when the concentration of $FeCl_3$ was about 2.7M.

The characteristics of the organic solvent of the continuous phase affect both the electrical and mechanical properties of the composites. In Examples 1 through 4, toluene was used as an organic solvent. In Example 5, a mixture of toluene and isooctane dissolves the host polymer and the surfactant.

EXAMPLE 5

Several samples were produced using the method of Example 1. For each sample the PPY/SBS weight ratio was decreased such that a set of samples were produced having PPY/SBS ratios between 2/3 and 0.5/3. The toluene organic solvent was replaced with a mixture of toluene and isooctane. In a microemulsion, when AOT is used as an emulsifier, isooctane has a higher capacity than toluene for the solubilization of water. Since SBS does not easily dissolve in isooctane but dissolves in toluene, the mixture toluene-isooctane was employed as the solvent in the continuous phase. The system's fixed inputs were as follows: 40 ml toluene; 45 ml isooctane; molar ratio of oxidant/pyrrole=2; $[FeCl_3]$=2.7M. Samples were processed and tested as in Example 2, and polypyrrole content of the samples was determined based on an elemental analysis of nitrogen. The results are presented in Table 4.

Comparing Tables 4 and 1, it is seen that the conductivity of the samples improves when a mixture of toluene and isooctane is used as an organic solvent, as opposed to only toluene. It is seen further by comparing Tables 4 and 1 that use of the mixture leads to a somewhat smaller elongation at the breakpoint than use of toluene only. Isooctane is not as compatible as toluene with the styrene blocks in the SBS triblock copolymer. Note that Sample 18 having a PPY-SBS weight ratio of 1.5/3 produced using a mixture of isooctane and toluene as an organic solvent exhibited the best combination of electrical and mechanical properties of all samples in Examples 1 through 5.

An SEM micrograph showing the morphology of a hot-pressed sheet of Sample 17 (having a PPY-SBS weight ratio of 2/3) is presented as FIG. 1. It is seen that SBS constitutes a continuous framework (indicated by the arrow) in which polypyrrole particles are dispersed.

While particularized embodiments of the invention have been described, it is understood that various changes and modifications within the spirit of the invention can be made. Accordingly, it is stressed that the invention is not to be taken as limited, except by the scope of the appended claims.

TABLE 1

Mechanical properties and electrical conductivity of PPY-SBS composites prepared by using toluene as the continuous medium[a]

| Sample | Composite (pyrrole/SBS)[b] | Conductivity (S/cm) cold pressing | Conductivity (S/cm) hot pressing | Tensile strenth at the break point (MPa) | Elongation at the break point (%) |
|---|---|---|---|---|---|
| 1 | PPY-SBS-(0.5/3) |  | Negligible |  |  |
| 2 | PPY-SBS-(1/3) | $1.1 \times 10^{-2}$ | $1.8 \times 10^{-2}$ | 8.5 | 628 |
| 3 | PPY-SBS-(2/3) | 0.2 | 0.4 | 12.2 | 187 |
| 4 | PPY-SBS-(3/3) | 0.3 | 0.4 | Negligible | Negligible |
| 5 | PPY-SBS-(4/3) | 1.0 | 0.2 | as above | as above |
| 6 | PPY-SBS-(5/3) | 2.2 | 0.4 | as above | as above |

[a]The other conditions have been: (1) 80 ml of tuluene were used; (2) the molar ratio of $FeCl_3$/pyrrole = 2; (3) the molar ratio of $H_2O$/AOT = 50; and $[FeCl_3]$ = 4.4M.
[b]The weight ratio of pyrrole to SBS used in the feedstock.

TABLE 2

The electrical conductivity of PPY-SBS-(2/3) composites prepared with various amounts of AOT[a]

| Sample | Molar ratio of $H_2O$/AOT | Conductivity (S/cm) | |
| --- | --- | --- | --- |
| | | cold pressing disc | hot pressing sheet |
| 7 | ∞ | $9.1 \times 10^{-3}$ | $9.6 \times 10^{-4}$ |
| 8 | 50 | 0.2 | 0.4 |
| 9 | 24 | 0.6 | 0.7 |
| 10 | 16 | 0.9 | 0.9 |

[a]The other conditions have been: (1) 80 ml of tuluene were used; (2) the molar ratio of $FeCl_3$/pyrrole = 2; (3) the weight ratio of pyrrole/SBS = 2/3; and $[FeCl_3] = 4.4M$.

TABLE 3

Effect of the concentration of oxidant $FeCl_3$ on the conductivity of PPY-SBS composites[a]

| Sample | Composite (pyrrole/SBS) | $[FeCl_3]$ (M) | Conductivity (S/cm) | |
| --- | --- | --- | --- | --- |
| | | | cold pressing disc | hot pressing sheet |
| 11 | PPY-SBS-(2/3) | 6.0 | 0.4 | 0.3 |
| 12 | PPY-SBS-(2/3) | 4.4 | 0.6 | 0.7 |
| 13 | PPY-SBS-(2/3) | 2.7 | 0.8 | 1.9 |
| 14 | PPY-SBS-(1.5/3) | 2.7 | the surface of the disc was rough | 1.6 |
| 15 | PPY-SBS-(1/3) | 2.7 | as above | 0.8 |
| 16 | PPY-SBS-(2/3) | 1.9 | as above | 1.1 |

[a]The other conditions have been: (1) 80 ml of tuluene were used; (2) the molar ratio of $FeCl_3$/pyrrole = 2; and (3) AOT (13.6 g, 30 mmole),

TABLE 4

The mechanical properties and electrical conductivity of PPY-SBS composites prepared with 40 ml toluene and 45 ml isooctane as the continuous medium of the inverted emulsion[a]

| Sample | Composite (pyrrole/SBS) | Content of[b] PPY (wt %) | Yield of the polymerization (%) | Tensile strength at the break point (MPa) | Elongation at the break point (%) | Conductivity (S/cm) |
| --- | --- | --- | --- | --- | --- | --- |
| 17 | PPY-SBS-(2/3) | 23.7 | 66 | 7.5 | 47 | 2.8 |
| 18 | PPY-SBS-(1.5/3) | 20.5 | 87 | 13.4 | 259 | 2.7 |
| 19 | PPY-SBS-(1/3) | 15.4 | 79 | 7.9 | 67 | 1.7 |
| 20 | PPY-SBS-(0.5/3) | 6.3 | 48 | 9.7 | 559 | $2.3 \times 10$ |

[a]The other conditions have been: (1) the molar ratio of oxidant/pyrrole = 2; and (2) $[FeCl_3] = 2.7M$.
[b]The content of polypyrrole in the composite was evaluated on the basis of the elemental analysis of nitrogen.

What is claimed is:

1. A method for making a composite having a conductive polymer uniformly distributed within a non-conductive polymer, said method comprising the steps of:

forming an inverted emulsion having in the continuous phase a nonconductive polymer and a surfactant dissolved in a first organic solvent, and in the dispersed phase, an oxidant dissolved in water;

adding slowly into said emulsion a monomer dissolved in a second organic solvent to form a composite in said emulsion, said monomer yielding a conductive polymer upon polymerization, said organic solvent being miscible with said first organic solvent; and separating said composite from said emulsion;

wherein said non-conductive polymer is styrene/butadiene/styrene, said surfactant is bis(2-ethylhexyl) sodium sulfosuccinate, said first organic solvent is toluene, said oxidant is ferric chloride, said monomer is pyrrole, said second organic solvent is toluene, and said precipitant-agent is methanol and further wherein the weight ratio of pyrrole to styrene/butadiene/styrene is from about 1/3 to about 2/3;

the molar ratio of ferric chloride to pyrrole is from about 1.0 to about 3.0;

the molar ratio of water to bis(2-ethylhexyl) sodium sulfosuccinate is from about 5 to about 50;

the volume ratio of the first organic solvent to the aqueous solution of ferric chloride is from about 1.0 to about 10.0;

the volume ratio of the second organic solvent to the first organic solvent is up to about 0.5;

the concentration of styrene/butadiene/styrene in said first organic solvent is up to about 0.1 g per ml toluene.

2. A method for making a composite having a conductive polymer uniformly distributed within a non-conductive polymer, said method comprising the steps of:

forming an inverted emulsion having in the continuous phase styrene/butadiene/styrene and bis(2-ethylhexyl) sodium sulfosuccinate dissolved in a first organic solvent, and in the dispersed phase, ferric chloride dissolved in water, wherein said first organic solvent is toluene;

adding slowly into said emulsion pyrrole dissolved in a second organic solvent to form a conductive polymer—non-conductive polymer composite in said emulsion, wherein said second organic solvent is toluene; and separating said composite from said emulsion;

wherein the weight ratio of pyrrole to styrene/butadiene/styrene is from about 1/3 to about 2/3;

the molar ratio of ferric chloride to pyrrole is from about 1.0 to about 3.0;

the molar ratio of water to bis(2-ethylhexyl) sodium sulfosuccinate is from about 5 to about 50;

the volume ratio of the first organic solvent to the aqueous solution of ferric chloride is from about 1.0 to about 10.0;

the volume ratio of the second organic solvent to the first organic solvent is up to about 0.5;

the concentration of styrene/butadiene/styrene in said first organic solvent is up to about 0.1 g per ml toluene.

3. The method of claim 2, wherein:

the molar ratio of ferric chloride to pyrrole is from about 1.5 to about 2.5;

the molar ratio of water to bis(2-ethylhexyl) sodium sulfosuccinate is from about 10 to about 35;

the volume ratio of the first organic solvent to the aqueous solution of ferric chloride is from about 2.0 to about 8.0;

the volume ratio of the second organic solvent to the first organic solvent is up to about 0.02 to about 0.4;

the concentration of styrene/butadiene/styrene in said first organic solvent is up to about 0.06 g per ml toluene.

4. The method of claim 2, wherein:

the weight ratio of pyrrole to styrene/butadiene/styrene is about 2/3;

the molar ratio of ferric chloride to pyrrole is about 2.0;

the molar ratio of water to bis(2-ethylhexyl) sodium sulfosuccinate is from about 25;

the volume ratio of the first organic solvent to the aqueous solution of ferric chloride is about 5.0;

the volume ratio of the second organic solvent to the first organic solvent is up to about 0.13.

5. A method for making a composite having a conductive polymer uniformly distributed within a non-conductive polymer, said method comprising the steps of:

forming an inverted emulsion having in the continuous phase a non-conductive polymer and a surfactant dissolved in a first organic solvent, and in the dispersed phase, an oxidant dissolved in water;

adding slowly into said emulsion a monomer dissolved in a second organic solvent to form a composite in said emulsion, said monomer yielding a conductive polymer upon polymerization, said organic solvent being miscible with said first organic solvent; and separating said composite from said emulsion;

wherein said non-conductive polymer is styrene/butadiene/styrene, said surfactant is bis(2-ethylhexyl) sodium sulfosuccinate, said first organic solvent is a mixture of toluene and isooctane, said oxidant is ferric chloride, said monomer is pyrrole, said second organic solvent is toluene, and said precipitant-agent is methanol and further wherein the weight ratio of pyrrole to styrene/butadiene/styrene is from about 1/3 to about 2/3;

the molar ratio of ferric chloride to pyrrole is from about 1.0 to about 3.0;

the molar ratio of water to bis(2-ethylhexyl) sodium sulfosuccinate is from about 5 to about 50;

the volume ratio of the first organic solvent to the aqueous solution of ferric chloride is from about 1.0 to about 10.0;

the volume ratio of isooctane to toluene in the first organic solvent is between about 0.5 and about 2.0;

the volume ratio of the second organic solvent to the first organic solvent is up to about 15;

the concentration of styrene/butadiene/styrene in said first organic solvent is up to about 0.06 g per ml first organic solvent.

6. A method for making a composite having a conductive polymer uniformly distributed within a non-conductive polymer, said method comprising the steps of:

forming an inverted emulsion having in the continuous phase styrene/butadiene/styrene and bis(2-ethylhexyl) sodium sulfosuccinate dissolved in a first organic solvent, and in the dispersed phase, ferric chloride dissolved in water, wherein said first organic solvent is a mixture of toluene and isooctane;

adding slowly into said emulsion pyrrole dissolved in a second organic solvent to form a conductive polymer— non-conductive polymer composite in said emulsion, wherein said second organic solvent is toluene; and separating said composite from said emulsion;

wherein the weight ratio of pyrrole to styrene/butadiene/styrene is from about 1/3 to about 2/3;

the molar ratio of ferric chloride to pyrrole is from about 1.0 to about 3.0;

the molar ratio of water to bis(2-ethylhexyl) sodium sulfosuccinate is from about 5 to about 50;

the volume ratio of the first organic solvent to the aqueous solution of ferric chloride is from about 1.0 to about 10.0;

the volume ratio of isooctane to toluene in the first organic solvent is between about 0.5 and about 2.0;

the volume ratio of the second organic solvent to the first organic solvent is up to about 15;

the concentration of styrene/butadiene/styrene in said first organic solvent is up to about 0.06 g per ml first organic solvent.

7. The method of claim 6, wherein:

the molar ratio of ferric chloride to pyrrole is from about 1.5 to about 2.5;

the molar ratio of water to bis(2-ethylhexyl) sodium sulfosuccinate is from about 10 to about 35;

the volume ratio of the first organic solvent to the aqueous solution of ferric chloride is from about 2.0 to about 8.0;

the volume ratio of the second organic solvent to the first organic solvent is from about 5.0 to about 10.0.

8. The method of claim 6, wherein:

the weight ratio of pyrrole to styrene/butadiene/styrene is about 1.5/3;

the molar ratio of ferric chloride to pyrrole is about 2.0;

the molar ratio of water to bis(2-ethylhexyl) sodium sulfosuccinate is about 33;

the volume ratio of the first organic solvent to the aqueous solution of ferric chloride is about 4.5;

the volume ratio of isooctane to toluene in the first organic solvent is about 1.2;

the volume ratio of the second organic solvent to the first organic solvent is about 8.5.

* * * * *